United States Patent
Anderson et al.

(10) Patent No.: US 6,629,251 B1
(45) Date of Patent: Sep. 30, 2003

(54) ELASTIC STORE CIRCUIT WITH VERNIER CLOCK DELAY

(75) Inventors: Walker Edward Anderson, San Diego, CA (US); Thomas Gordon Palkert, Excelsior, MN (US); Robert S. Tepper, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/420,983

(22) Filed: Oct. 20, 1999

(51) Int. Cl.7 .............................. G06F 1/12; G06F 3/00
(52) U.S. Cl. ...................... 713/401; 713/400; 713/600; 710/52
(58) Field of Search ................................. 713/400, 401, 713/500, 600; 375/372, 375; 370/516, 545; 710/52

(56) References Cited

U.S. PATENT DOCUMENTS

| | | | |
|---|---|---|---|
| 4,327,411 A | | 4/1982 | Turner ........................ 364/900 |
| 4,600,945 A | * | 7/1986 | Bolger ........................ 428/403 |
| 4,704,574 A | * | 11/1987 | Nossen ..................... 324/76.82 |
| 4,819,208 A | * | 4/1989 | Nakabayashi et al. . 365/189.04 |
| 5,015,970 A | | 5/1991 | Williams et al. .............. 331/11 |
| 5,038,277 A | * | 8/1991 | Altman et al. ................ 710/56 |
| 5,063,437 A | * | 11/1991 | Owashi et al. .............. 348/662 |
| 5,195,088 A | * | 3/1993 | Urbansky ................... 370/545 |
| 5,245,414 A | * | 9/1993 | Wischermann .............. 348/500 |
| 5,260,940 A | | 11/1993 | Urbansky .................... 370/84 |
| 5,263,056 A | * | 11/1993 | Urbansky ................... 375/363 |
| 5,394,106 A | | 2/1995 | Black et al. ................. 327/107 |
| 5,471,332 A | * | 11/1995 | Shiragaki et al. ........... 359/117 |
| 5,499,274 A | | 3/1996 | Brown ....................... 375/376 |
| 5,519,854 A | * | 5/1996 | Watt ........................... 713/401 |
| 5,537,447 A | * | 7/1996 | Urbansky ................... 375/372 |
| 5,604,773 A | * | 2/1997 | Urala ......................... 375/372 |
| 5,699,391 A | | 12/1997 | Mazzurco et al. .......... 375/372 |
| 5,796,796 A | * | 8/1998 | Wang ......................... 375/372 |
| 5,859,882 A | * | 1/1999 | Urbansky ................... 375/375 |
| 6,055,285 A | * | 4/2000 | Alston ........................ 375/372 |
| 6,067,304 A | * | 5/2000 | Nishioka .................... 370/516 |
| 6,115,318 A | * | 9/2000 | Keeth ......................... 365/233 |
| 6,236,695 B1 | * | 5/2001 | Taylor ........................ 375/372 |

* cited by examiner

Primary Examiner—Thomas Lee
Assistant Examiner—Chun Cao
(74) Attorney, Agent, or Firm—Incaplaw; Terrance A. Meador

(57) ABSTRACT

An elastic store circuit using a first in/first out buffer (FIFO) to accurately delay and manipulate a waveform using the write (WR) and read (RD) clocks is provided. The FIFO delays data by, first, reading the input data at the WR clock rate. Then, the data exits the FIFO in response to the RD clock. Large delays are accomplished by changing the relationship between the WR and RD clocks in whole clock intervals. Delays and adjustments of less than a whole clock interval are accomplished by changing the phase relationship of the RD clock with respect to the WR clock. The present invention generates the WR and RD clocks through synthesis using a lower frequency reference clock. The RD phase change results from introducing a phase change into the reference clock driving the RD clock synthesizer. A method of introducing precise delays through phase control of the WR and RD clocks is also provided.

22 Claims, 3 Drawing Sheets

ELASTIC STORE CIRCUIT WITH VERNIER CLOCK DELAY

BACKGROUND AND SUMMARY OF THE INVENTION

This invention is generally related to integrated circuit (IC) signal timing circuitry and, more particularly, to a method of delaying signals through an elastic store for times of less than a clock cycle, through precise control of the clocking signals.

An elastic store is a circuit often used in a receiver to acquire asynchronous input data, or to collect data from sources with unpredictable transmission delays. The elastic store can also be used to combine multiplexed data sources. That is, the elastic store receives data at uncertain clock rates and converts it to the receiver clock rate. Conventionally, the elastic store accepts data at a write (WR) clock rate, and supplies it at the read (RD) clock rate. A commutator system is used to create delay by adjusting the number of clock cycles between when data is written, and when it is read.

Conventional elastic store circuits provide a delay of at least one clock cycle. These circuits are useful if large delays are required between the input and output data. However, problems arise in using elastic stores to create a delay of less than a clock cycle. Neither are conventional elastic stores useful if a delay equal to a non-integer value of a clock cycle is required, for example, a delay of 1.5 clock cycles. It is possible to add delay circuitry to the input or output data lines of the elastic store to achieve delays that are not an integer value of a clock cycle. However, keeping such delay circuitry synchronously aligned with the WR and RD clocks of the elastic store is a problem. Further, such delay circuitry is not readily available for high speed waveforms.

In co-pending patent application Ser. No. 09/420,976, entitled "ELASTIC STORE CIRCUIT WITH STATIC PHASE OFFSET," filed on Oct. 20, 1999, Anderson et al. disclose a system of controlled delay in an elastic store device with the introduction of a phase offset to the read clock, which results in elastic store delays of much less than a read or write clock cycle.

It would be advantageous if an elastic store could delay data for periods of time that are less than the WR and RD clock cycles to provide precise control over the timing of signals.

It would be advantageous if delays of less than a WR/RD clock cycle could be made programmable and repeatable.

It would be advantageous if non-integer clock cycle delays could be maintained in a synchronous relationship to the WR and RD clocks.

It would be advantageous if an elastic store had the capacity to delay data signals in increments of time greater than a WR/RD clock cycle, simultaneously with the capacity to make adjustments that are in increments smaller than the period of a WR/RD clock.

Accordingly, an elastic store is provided with programmable delay. The elastic store comprises a vernier circuit having an input to accept the reference clock. The vernier circuit also accepts a digital control signal, to provide the reference clock with a first delay at its output.

The elastic store also includes a first in/first out (FIFO) circuit: The FIFO has a first input to receive data input, and a second input to accept a write (WR) clock that is synchronous to the reference clock. The FIFO has a third input to accept a read (RD) clock which is synchronous to the delayed reference clock. Therefore, the FIFO reads data input at the rate of the delayed RD clock. Because the delay is accomplished with the clocks, instead of in the data lines, fine delays of less than one RD clock cycle can be accomplished.

A first clock synthesizer unit (CSU) receives the delayed reference clock from the vernier circuit, and supplies the RD clock to the FIFO. A second CSU receives the reference clock and provides the WR clock to the FIFO.

In one aspect of the invention, a multiplexer (MUX) circuit is provided which accepts parallel data input signals. The MUX also receives the WR clock from the second CSU, and the parallel data lines are combined into a serial data stream at the WR clock rate.

A method for precisely controlling the delay of input data in a FIFO data transfer is also provided comprising the steps of:

a) generating a reference clock;

b) generating a WR clock, synchronous to the reference clock;

c) delaying the reference clock to create a delayed reference clock;

d) generating a RD clock, synchronous to the delayed reference clock;

e) writing input data at the WR clock rate; and f) reading the input data at the RD clock rate, whereby an elastic store with a precise delay is created.

Detailed Description of the Preferred Embodiment

Figure 1:
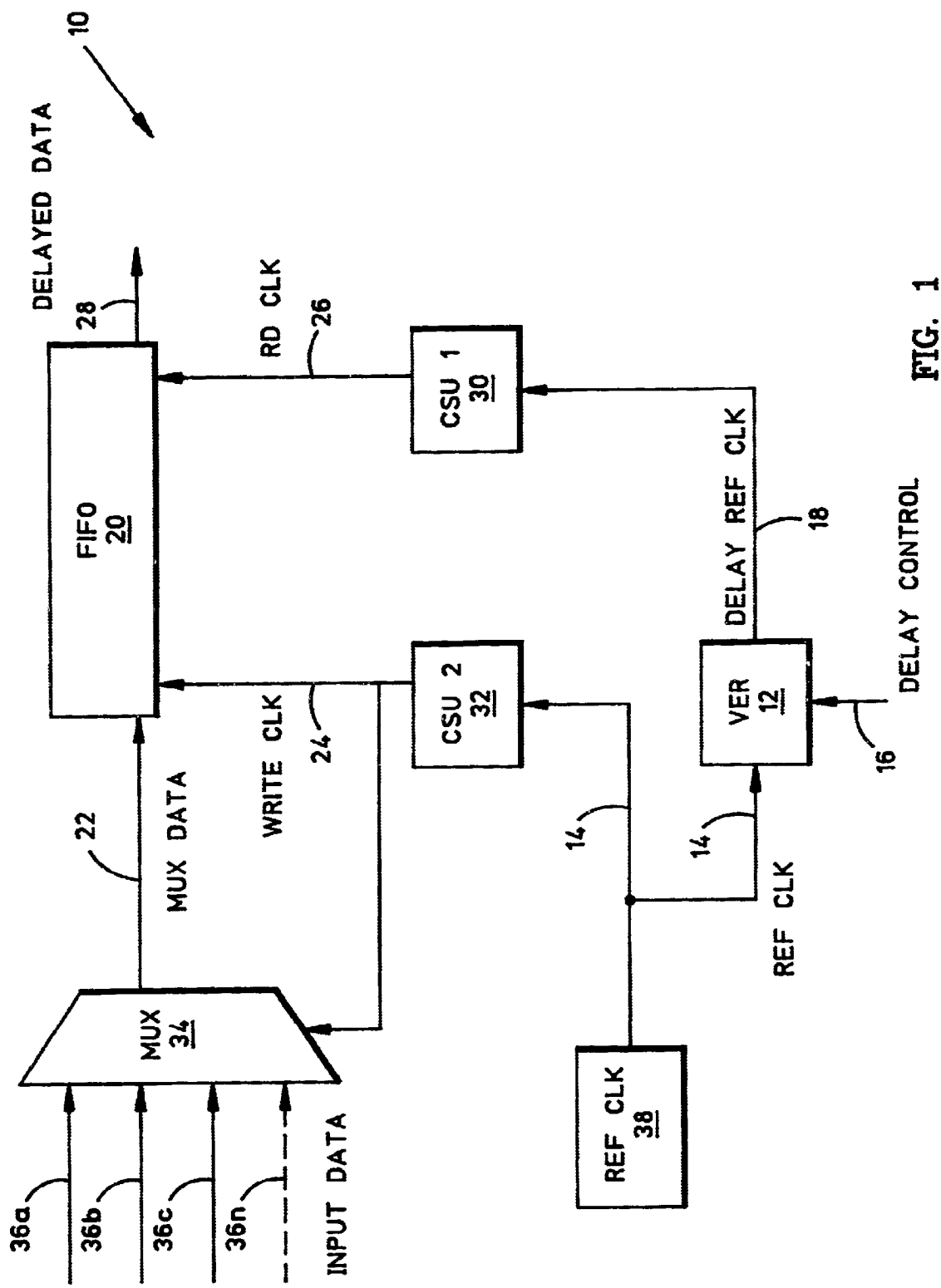
FIG. 1 is a block diagram schematic of the present invention elastic store with programmable delay.

FIG. 1 is a block diagram schematic of the present invention elastic store with programmable delay. Elastic store 10 comprises a vernier circuit 12 having a first input on line 14 to receive a reference clock at a first frequency. For example, the reference clock may have a frequency of 400 megahertz (MHz) with a clock cycle period of 2.5 nanoseconds (ns). Vernier circuit 12 has a second input on line 16 to accept a fine delay control signal. Typically, the control lines are digital signals, such as those associated with a data or address bus. The control of vernier circuit 12 with digital signals adds the element of a programmable, repeatable, and consistent delay to the invention. Vernier circuit 12 includes an output on line 18 to provide the reference clock with a first delay in response to the fine delay control signal on line 16. Advantageously, the present invention permits the delay to be a non-integer value of the first clock cycle. With a 400 MHz reference signal, for example, a delay of less than 2.5 ns can be created.

A first in/first out (FIFO) circuit 20 has a first input to receive data input on line(s) 22, a second input on line 24 to accept a write (WR) clock at a second frequency, which is synchronous to the first frequency of the reference clock on line 18. For example, the second frequency is 1.6 gigahertz (GHz) with a clock cycle period of 625 picoseconds (ps). FIFO 20 has a third input on line 26 to accept a read (RD) clock. The RD clock on line 26 also operates at the second frequency. For example, delay steps as small as 20 ps are realizable with the present invention. Alternately stated, the RD clock is synchronous to the WR clock, with a phase delay. FIFO 20 has an output on line 28 to provide the data input at the second frequency, with the delay corresponding to the RD clock on line 26. In this manner, the input signals on line 22 are delayed in response to the WR and RD clock signals.

In some aspects of the invention, the RD clock has a time delay of less than a second frequency clock cycle, whereby the input delay is finely adjusted. That is, the delay through FIFO 20 can be controlled in increments of less than a clock cycle of either the WR or RD clocks. The same delay concept applies to time delays of greater than a RD clock cycle. However, alternate methods are presented below which can be used to create delays in whole clock cycle increments. The present invention permits the combination of coarse adjustments, using conventional methods, with fine adjustments of less than a clock cycle using phase delay of the reference clock.

A first clock synthesizer unit (CSU) 30 has a first input on line 18 operatively connected to the output of vernier circuit 12 to receive the delayed reference clock signal having the first has an output on line 26 operatively connected to the third input of FIFO 20 to provide a RD clock at the second frequency. In this manner, the delay in the reference clock is translated to the clocking frequency of FIFO 20.

A second CSU 32 has a first input on line 14 to receive the reference clock at the first frequency. Second CSU 32 has a WR clock output on line 24 operatively connected to the second input of FIFO 20 to provide the WR clock at the second frequency, synchronous to the reference clock first frequency.

A multiplexer (MUX) circuit 34 has a first plurality of inputs to accept a first plurality of data input signals on lines 36a, 36b, 36c, and 36n. That is, there may be any number of inputs into MUX 34. The present invention is not limited to only four inputs, there may be more or less. MUX 34 has a second input on line 24 operatively connected to the output of second CSU 32 to accept the WR clock as control signals. MUX 34 has an output on line 22 to provide a multiplexed combination of the first plurality of data input signals. The data signals are clocked through MUX 34 at the second frequency of the WR clock on line 24, because the WR clock acts as the MUX control signal.

A reference clock 38 has an output on line 14 operatively connected to the input of vernier circuit 12, and to the input of second CSU 32 to provide the reference clock at the first frequency.

FIG. 1 illustrates elastic store 10 for the control of the inputs to MUX 34, where the data inputs are either synchronous to the clocks of elastic store 10, or not. One such application is the precise control of the waveforms needed to test and calibrate automatic test equipment (ATE). Alternately, the present invention of FIG. 1 is applicable to the control of asynchronous data transmissions, where the received data is to be aligned with receiver clocks.

Figure 2:
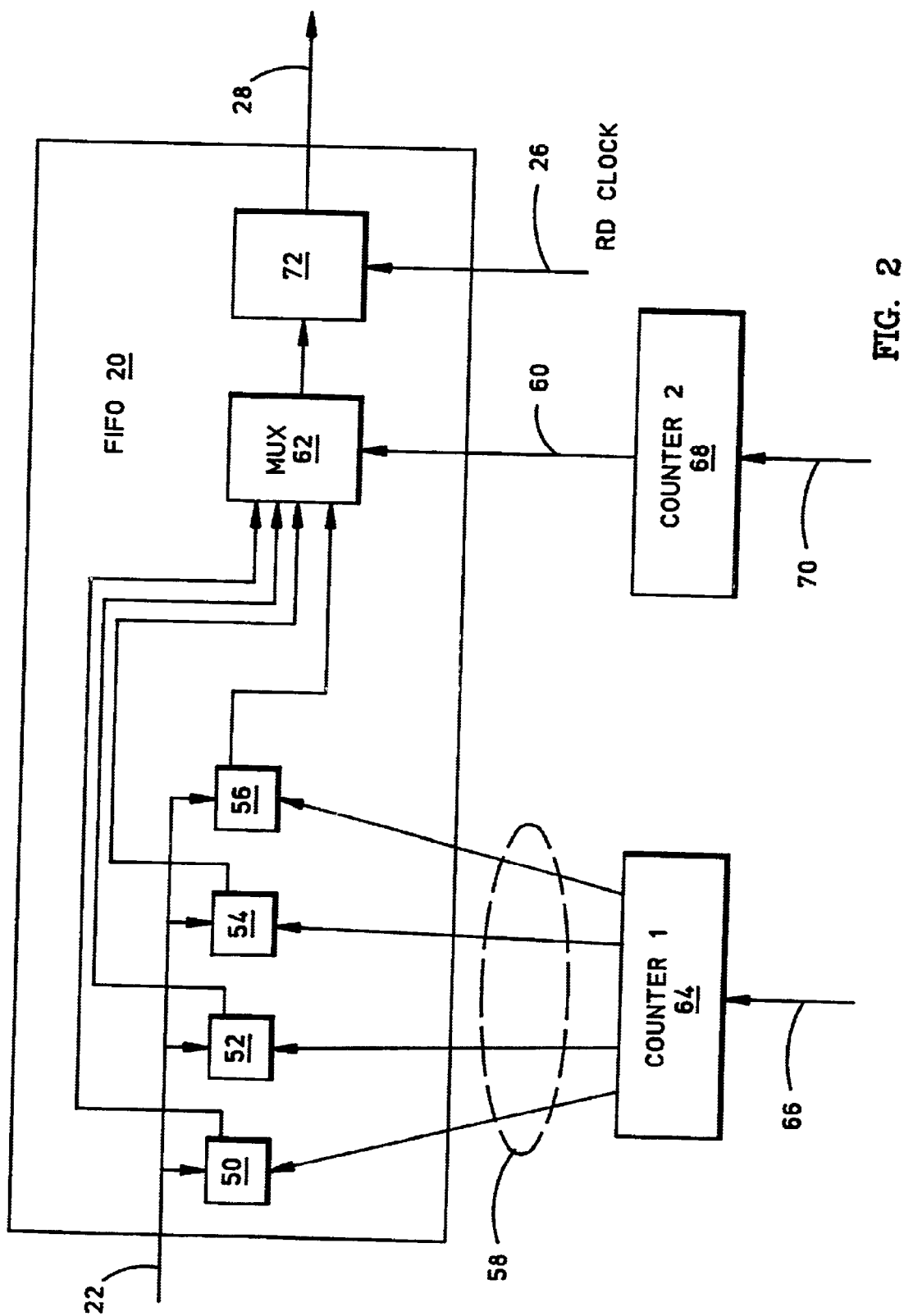
FIG. 2 illustrates details of the FIFO of FIG. 1.

FIG. 2 illustrates details of FIFO 20 of FIG. 1. FIFO 20 includes a plurality of registers to store input data. FIG. 2 depicts registers 50, 52, 54, and 56, however, the present invention system is applicable to any number of registers. A fourth input on line(s) 58 accepts control signals which select which of registers 50, 52, 54, and 56 are written upon initialization of FIFO 20. In some aspects of the invention the registers are flip-flops, although the input data can be stored using any of the alternate means that are well known in the art. Four control signals are depicted as associated with line(s) 58, however, communication may be serial in a single line. Further, as is well understood in the art, all the input lines to and from FIFO 20 are data/address buses in some aspects of the invention. A fifth input on line 60 accepts control signals to select which register is read upon initialization. A MUX type circuit 62 is shown to accomplish the register read function. However, numerous other methods may be used to select which data bits are to be read and output on line 28.

The control circuitry on line(s) 58 selects which of registers 50, 52, 54, and 56 is written, or loaded upon initialization of FIFO 20. After initialization, data is written in a cyclical order. For example, if register 2 (52) is selected at initialization, the data is written into register 2 (52), then register 3 (54), register 4 (56), register 1. (50), and returning to register 2 (52) in a cyclical, continuing pattern advanced by the WR clock (not shown). Likewise, the data is read in cyclical pattern starting with the register selected upon initialization with the control line 60. In this manner, a predetermined number of clock cycle delays are programmed between the reading of data and the writing of data, so that a coarse delay is programmable. Typically, FIFO 20 has a latency of at least one second frequency clock cycle between receiving the input data at the first input on line 22 and providing the data at the output on line 28.

A first counter, or divider circuit 64 has a first input on line 66 to accept initialization commands to program the state of first counter 64 upon initialization, and an output on line 58 operatively connected to the fourth input of FIFO 20 to select which of registers 50, 52, 54, and 56 is initially written. By making counter 64 programmable, the same registers are written and read upon initialization, and the same timing relationships are maintained. Counter 64 may include flip-flops and AND gates to accomplish the selection function as is well known. A second counter, or divider 68 has a first input on line 70 to accept initialization commands to program the state of second counter 68 upon initialization, and an output on line 60 operatively connected to the fifth input of FIFO 20 to select which register is initially read. In this manner, a coarse delay of at least one WR clock cycle is introduced into data signals at the output on line 28 of FIFO 20. In some aspects of the invention (not shown), FIFO. 20 includes first and second counters 64 and 68, whereby coarse adjustments are made with initialization commands on lines 66 and 70 to FIFO 20. That is, the counter circuitry is internal to FIFO 20. An output register 72 is operatively connected to the output of MUX 62. The output data is reclocked using the RD clock on line 26 for finer timing control.

The present invention was developed out of the need to both control relatively high speed data flow, and to more precisely delay the waveforms of these data streams. In some aspects of the invention the second frequency is greater than approximately 1.0 gigahertz (GHz), and the first frequency is in the range of approximately 10 and 400 MHz. Further, although not critical to the invention, the second frequency is approximately four times as great as the first frequency, or greater.

Figure 3:
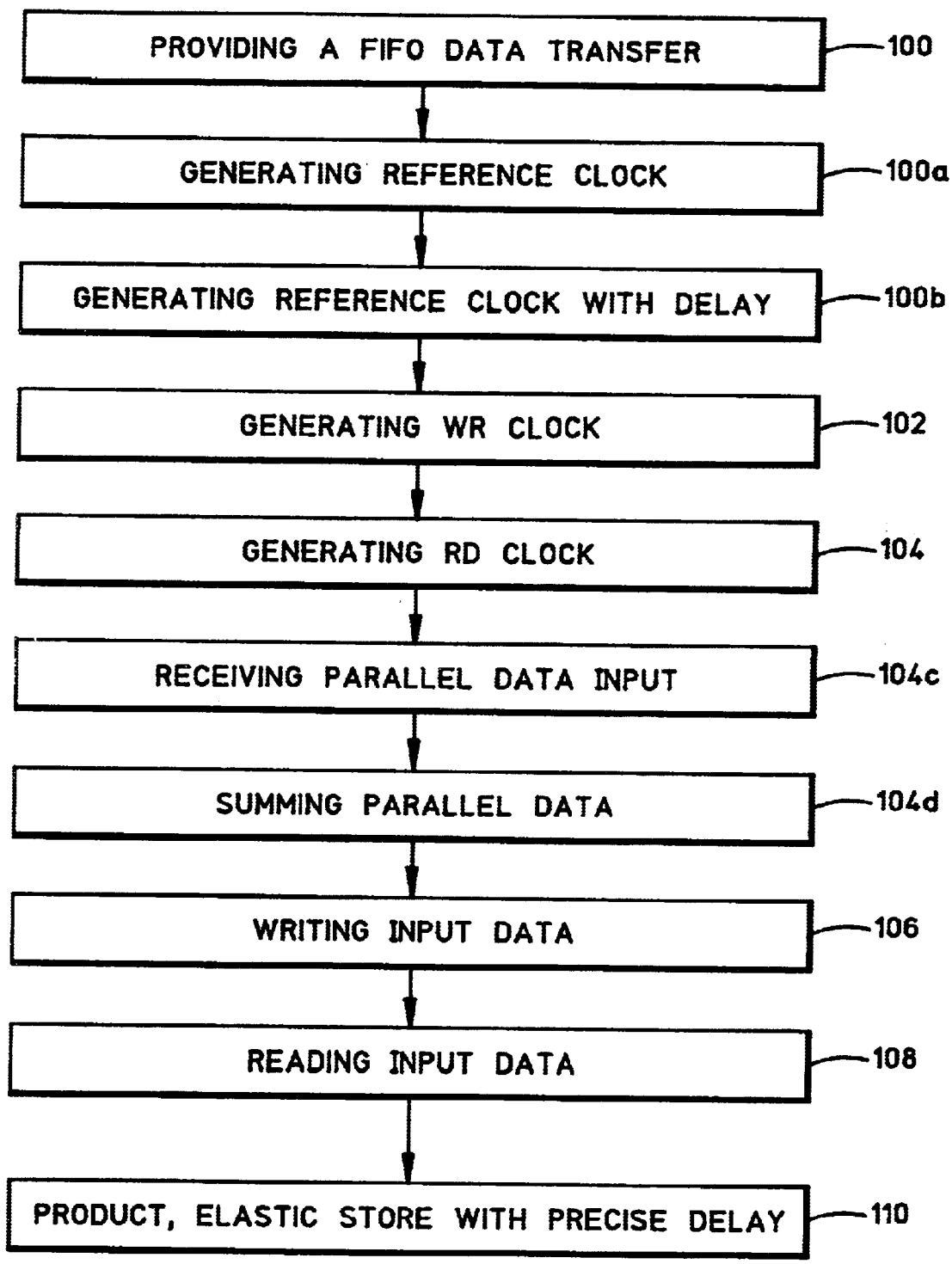
FIG. 3 is a flowchart illustrating steps in the present invention method for precisely controlling the delay of input data.

FIG. 3 is a flowchart illustrating steps in the present invention method for precisely controlling the delay of input data. Step 100 provides a first in/first out (FIFO) data transfer. Step 102 generates a write (WR) clock having a second frequency. Step 104 generates a read (RD) clock having the second frequency, where the RD clock signal is delayed relative to the WR clock signal. Because the vernier delay creates a delayed reference clock that is not phase locked to either the reference clock or the WR clock, small phase tracking errors can be introduced when the RD clock is compared to the WR clock. Therefore, the RD clock is approximately synchronous, with the WR clock, with a delay.

Step 106 writes input data at the WR clock rate of Step 102. Step 108 reads the input data at the RD clock rate of Step 104. Step 110 is a product, where an elastic store with a precise delay is created.

In some aspects of the invention, further steps precede Step 102. Step 100a generates a reference clock having a first frequency, and Step 100b delays the reference clock of Step 100a to create a delayed reference clock. Then, Step 102 includes generating the WR clock synchronously with the reference clock of Step 100a. Step 104 includes generating the RD clock synchronously with the delayed reference clock.

In some aspects of the invention Step 100 provides a plurality of serial storage registers. Then, further steps precede Step 106. Step 104a (not shown) selects which register is initially written in Step 106. Step 104b (not shown) selects which register is initially read, in Step 108, whereby:the interval between initial write and.read registers represents a third delay. Step 108 includes reading the input data from the plurality of serial storage registers, beginning with the register selected in Step 104b, whereby a coarse delay is added to the elastic store. Step 108 includes the third delay being equal to the number of clock cycles occurring between the writing of a first data in Step 106 and the reading of the first data in Step 108.

In some aspects of the invention further steps precede Step 106. Step 104c receives a plurality of parallel input data signals. Step 104d multiplexes the parallel input data signals at a rate equal to the second frequency to generate serial input data, whereby the timing of a multiplexed data source is controlled.

In some aspects of the invention Step 100 provides a MUX having a plurality of parallel data inputs, a second input to accept control signals, and an output to provide a serial multiplex of the plurality of parallel data inputs. Step 104c includes receiving the plurality of parallel data inputs at the plurality of MUX data inputs, and Step 104d includes providing the multiplex of the data inputs at the MUX output in response to WR clock signals at the MUX second input. See MUX 34 of FIG. 1.

In other aspects of the invention, Step 100 provides a vernier delay circuit having a first input to accept a waveform, a second input to accept control signals, and an output to provide a delayed version of the input waveform. Step 100b includes the vernier delay circuit accepting the reference clock at the first input, accepting control signals at the second input, and providing the reference clock with the first delay responsive to the control signals.

In some aspects of the invention Step 100 provides a first clock synthesis unit (CSU) having an input and an output (see CSU 30 of FIG. 1). Step 104 includes inputting the reference clock with the first delay of Step 100b. Step 104 also includes generating the RD clock (delayed relative to the WR clock) at the first CSU output. Likewise, Step 100 provides a second CSU (CSU 32 of FIG. 1) having an input and an output. Step 102 includes inputting the reference clock of Step 100a, and includes generating the WR clock at the first CSU output.

A system and method of using an elastic store, or FIFO, to accurately delay and manipulate a waveform using the WR and RD clocks has been provided. The FIFO delays data by first reading the input data at the WR clock rate. The data exits the FIFO in response to the RD clock. Large delays are accomplished by changing the relationship between the WR and RD clocks in whole clock intervals. Delays and adjustments of less than a whole clock interval are accomplished by changing the phase relationship of the RD clock with respect to the WR clock. The present invention generates the WR and RD clocks through synthesis using a lower frequency reference clock. The RD phase change results from introducing a phase change into the reference clock driving the RD clock synthesizer. Other variations and embodiments of the present invention will occur to those skilled in the art.

What is claimed is:

1. An elastic store with programmable delay comprising:

a vernier circuit having a first input to receive a reference clock at a first frequency, a second input to accept a fine delay control signal, and an output to provide a delayed reference clock having a phase delay relative to the reference clock, the delayed reference clock being provided in response to the fine delay control signal; and a first in/first out (FIFO) circuit having a first input to receive input data, a second input to accept a write (WR) clock at a second frequency, synchronous to the first frequency, and a third input to accept a read (RD) clock at the second frequency, the RD clock having said phase delay relative to the WR clock, said FIFO having an output to provide the input data at the second frequency, whereby the input data are delayed in response to the WR clock signal and the RD clock signal.

2. The elastic store of claim 1 in which the phase delay of the RD clock relative to the WR clock is less than a second frequency clock cycle, whereby the delay of the input data is finely adjusted.

3. The elastic store of claim 1 further comprising:

a first clock synthesizer unit (CSU) having a first input operatively connected to the output of said vernier circuit to receive the delayed reference clock, said first CSU having an output operatively connected to the third input of said FIFO to provide the RD clock, whereby the phase delay of the delayed reference clock is translated to a clocking frequency of the FIFO.

4. The elastic store of claim 3 further comprising:

a second CSU having a first input to receive the reference clock, said second CSU having a WR clock output operatively connected to the second input of said FIFO to provide the WR clock.

5. The elastic store of claim 4 further comprising:

a multiplexer (MUX) circuit having a first plurality of inputs to accept a first plurality of data input signals, said MUX having a.second input operatively connected to the output of said second CSU to accept the WR clock as control signals, and an output to provide a multiplexed combination of the first plurality of data input signals at the second frequency in response to the control signals.

6. The elastic store of claim 5 further comprising:

a reference clock generator having an output operatively connected to the input of said vernier circuit and the input of said second CSU to provide the reference clock at the first frequency.

7. The elastic store of claim 1 in which said FIFO includes a plurality of registers to store input data, a fourth input to accept control signals which select which register is written, upon initialization of said FIFO, and a fifth input to accept control signals to select which register is read, upon initialization, the elastic store further comprising:

a first counter having a first input to accept initialization commands to program the state of said first counter upon initialization, and an output operatively connected to the fourth input of said FIFO to select which register is initially written; and a second counter having a first input to accept initialization commands to program the state of said second counter upon initialization, and an output operatively connected to the fifth input of said FIFO to select which register is initially read, whereby a coarse delay is introduced into data signals at the output of said FIFO.

8. The elastic store of claim 7 in which said FIFO includes said first and second counters, whereby coarse adjustments are made with initialization commands to said FIFO.

9. The elastic store of claim 7 in which said FIFO has a latency of at least one second frequency clock cycle, between receiving the input data at the first input and providing the data at the output.

10. The elastic store as in claim 1 wherein the second frequency is greater than approximately 1.0 gigahertz (GHz), and the first frequency is in the range of approximately 10 and 400 MHz.

11. The elastic store as in claim 1 wherein the second frequency is approximately four times as great as the first frequency, or greater.

12. A method for precisely controlling the delay of input data in a first in/first out (FIFO) data transfer comprising:
   a) generating a reference clock having a first frequency;
   b) delaying the reference clock to create a delayed reference clock having a phase delay relative to the reference clock;
   c) generating, in response to the reference clock, a write (WR) clock having a second frequency that is synchronous with the reference clock;
   d) generating, in response to the delayed reference clock, a read (RD) clock having the second frequency, the RD clock having a phase delay, relative to the WR clock, of less than one clock cycle;
   e) writing input data in response to the WR clock; and
   f) reading the input data in response to the RD clock, whereby an elastic store with a precise delay is created.

13. The method as in claim 12, wherein a vernier delay circuit is provided having a first input to accept a waveform, a second input to accept control signals, and an output to provide a delayed version of the input waveform, and in which Step b) includes the vernier delay circuit accepting the reference clock at the first input, accepting control signals at the second input; and providing the reference clock with the first delay responsive to the control signals.

14. The method as in claim 12, wherein a first clock synthesis unit (CSU) is provided having an input and an output, and in which Step d) includes inputting the reference clock, Step d) also including the generation of the RD clock at the output of the first CSU.

15. The method as in claim 12, wherein a second CSU is provided having an input and an output, and in which Step c) includes inputting the reference clock, Step c) also including the generation of the WR clock at the output of the second CSU.

16. The method of claim 12, in which the second frequency is greater than approximately 1.0 gigahertz (GHz), and in which the first frequency is in the range of approximately 10 and 400 MHz.

17. The method of claim 12, in which the second frequency is approximately four times as great as the first frequency, or greater.

18. An elastic store with programmable delay comprising:
a data source that provides input data;
a reference clock generator having an output for providing a reference clock at a first frequency;
a vernier circuit having a first input operatively connected to the output of said reference clock generator, a second input to accept a fine delay control signal, and an output to provide a delayed reference clock in response to the fine delay control signal, the delayed reference clock having a phase delay relative to the reference clock;
a first clock synthesis unit (CSU) having a first input operatively connected to the output of said vernier circuit to accept the delayed reference clock, said first CSU having a read (RD) clock output to provide a RD clock at a second frequency, synchronous to the delayed reference clock;
a second CSU having a first input operatively connected to the output of said reference clock generator, said second CSU having a write (WR) clock output to provide a WR clock at the second frequency, synchronous to the reference clock; and
a first in/first out (FIFO) circuit having a, first input operatively connected to the data source to receive the input data, a second input operatively connected to the output of said second CSU to accept the WR clock, a third input operatively connected to the output of said first CSU to accept the RD clock, and an output to provide delayed data at the second frequency whereby the delayed data are delayed a precise amount, relative to the input data, in response to the phase delay.

19. A method for precisely controlling the delay of input data in a first in/first out (FIFO) data transfer comprising:
   a) generating a write (WR) clock having a second frequency that is synchronous with a reference clock having a first frequency;
   b) generating a read (RD) clock having the second frequency, the RD clock having a phase delay, relative to the WR clock, of less than one clock cycle, whereby a relatively precise delay is introduced;
   c) selecting an initial WR register from a plurality of storage registers;
   d) selecting an initial RD register from the plurality of storage registers, whereby the interval between the initial WR and RD registers represents a data store delay;
   e) writing input data in response to the WR clock, beginning with the initial WR register; and
   f) reading the input data from the plurality of storage registers in response to the RD clock, beginning with the initial RD register, whereby a relatively coarse delay is introduced.

20. The method as in claim 19, in which the data store delay is equal to the number of clock cycles occurring between the writing of a first data in Step e) and the reading of the first data in Step f).

21. A method for precisely controlling the delay of input data in a first in/first out (FIFO) data transfer comprising:
   a) generating a write (WR) clock having a second frequency that is synchronous with a reference clock having a first frequency;
   b) generating a read (RD) clock having the second frequency, the RD clock having a phase delay, relative to the WR clock, of less than one clock cycle;
   c) receiving a plurality of parallel input data signals;

d) multiplexing the parallel input data signals at a rate equal to the second frequency to generate serial input data, whereby the timing of a multiplexed data source is controlled;

e) writing input data in response to the WR clock; and f) reading the input data in response to the RD clock, whereby an elastic store with a precise delay is created.

22. The method of claim 21, wherein a MUX is provided having a plurality of parallel data inputs, a second input to accept control signals, and an output to provide a serial multiplex of the plurality of parallel data inputs, in which Step c) includes receiving the plurality of parallel input data-signals at the plurality of parallel data inputs, and in which Step d) includes providing the multiplex of the parallel data inputs at the output of the MUX in response to WR clock signals at the second input of the MUX.

* * * * *